US010419389B2

(12) United States Patent
Holbrook

(10) Patent No.: US 10,419,389 B2
(45) Date of Patent: Sep. 17, 2019

(54) METHOD AND SYSTEM FOR USING A TOP OF RACK SWITCH AS AN OVERLAY ROUTING INTERMEDIATE POINT

(71) Applicant: Arista Networks, Inc., Santa Clara, CA (US)

(72) Inventor: Hugh W. Holbrook, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/025,807

(22) Filed: Jul. 2, 2018

(65) Prior Publication Data

US 2019/0028426 A1 Jan. 24, 2019

Related U.S. Application Data

(60) Provisional application No. 62/535,073, filed on Jul. 20, 2017.

(51) Int. Cl.
*H04L 29/12* (2006.01)
*H04L 12/741* (2013.01)
*H04L 12/947* (2013.01)
*H04L 12/46* (2006.01)
*H04L 29/08* (2006.01)

(52) U.S. Cl.
CPC ...... *H04L 61/2007* (2013.01); *H04L 12/4641* (2013.01); *H04L 45/74* (2013.01); *H04L 49/25* (2013.01); *H04L 61/6022* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 2015/0010001 A1* | 1/2015 | Duda | ...................... | H04L 45/74 370/392 |
| 2015/0063353 A1* | 3/2015 | Kapadia | ................ | H04L 45/745 370/392 |
| 2015/0200847 A1* | 7/2015 | Gourlay | ................... | H04L 49/70 370/392 |
| 2015/0381386 A1* | 12/2015 | Sigoure | ............... | H04L 12/4645 370/392 |
| 2016/0036728 A1* | 2/2016 | Duda | ................... | H04L 12/4633 370/357 |
| 2017/0041223 A1* | 2/2017 | Akashi | .................. | H04L 61/103 |

* cited by examiner

*Primary Examiner* — Otis L Thompson, Jr.
(74) *Attorney, Agent, or Firm* — Chamberlain, Hrdlicka, White, Williams & Aughtry

(57) ABSTRACT

A method for transmitting MAC frames between remote and/or virtual machines, across network devices (i.e., switches, multilayer switches, and routers) that conventionally do not hold capacity to address MAC rewrites to any and all possible destinations within expanding data centers. More specifically, a network device retains MAC rewrite table entries corresponding to Top of Rack (ToR) switches versus to the hosts and virtual machines that reside under those ToR switches. This use of a ToR switch as an overlay routing intermediate point may reduce the number of required MAC addresses stored on a network device for the purposes of performing rewrites, thereby once again establishing the capability for packets to reach any arbitrary destination as data centers scale.

20 Claims, 17 Drawing Sheets

Initial MAC Frame 500

| SRC MAC A1 | DEST MAC ToR-1 | SRC IP A1 | DEST IP A2 | Payload |

*FIG. 5B*

1st VXLAN Frame 502

| SRC MAC S1 | DEST MAC ToR-1 | SRC IP VTEP-1 | DEST IP VTEP-2 | VNI A | Initial MAC Frame |

*FIG. 5C*

2nd VXLAN Frame 504

| SRC MAC ToR-1 | DEST MAC Next-Hop | SRC IP VTEP-2 | DEST IP VTEP-4 | VNI A | Initial MAC Frame |

*FIG. 5D*

Rewritten MAC Frame 506

| SRC MAC ToR-2 | DEST MAC A2 | SRC IP A1 | DEST IP A2 | Payload |

*FIG. 5E*

3rd VXLAN Frame 508

| SRC MAC ToR-2 | DEST MAC S2 | SRC IP VTEP-4 | DEST IP S2 | VNI A | Rewritten MAC Frame |

*FIG. 5F*

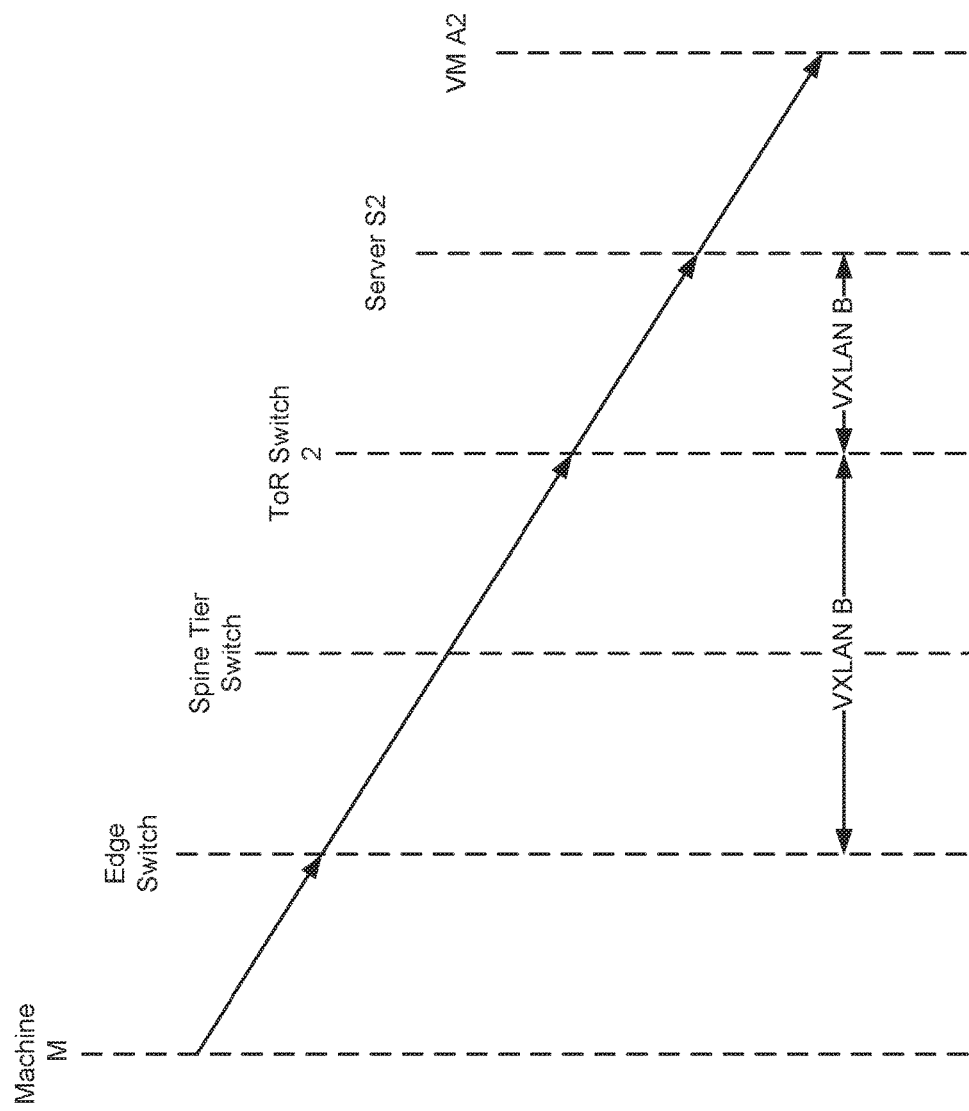

Inbound MAC Frame 700

| SRC MAC Prev. Hop | DEST MAC ES | SRC IP M | DEST IP A2 | Payload |

*FIG. 7B*

1st VXLAN Frame 704

| SRC MAC ES | DEST MAC Next-Hop | SRC IP VTEP-3 | DEST IP VTEP-4 | VNI B | Inbound MAC Frame |

*FIG. 7C*

Rewritten MAC Frame 706

| SRC MAC ToR-2 | DEST MAC A2 | SRC IP M | DEST IP A2 | Payload |

*FIG. 7D*

2nd VXLAN Frame 708

| SRC MAC ToR-2 | DEST MAC S2 | SRC IP VTEP-4 | DEST IP S2 | VNI B | Rewritten MAC Frame |

*FIG. 7E*

METHOD AND SYSTEM FOR USING A TOP OF RACK SWITCH AS AN OVERLAY ROUTING INTERMEDIATE POINT

CROSS-REFERENCE TO RELATED APPLICATIONS

This application claims benefit under 35 U.S.C. § 119(e) to U.S. Provisional Patent Application Ser. No. 62/535,073, filed on Jul. 20, 2017 and entitled, "METHODS AND SYSTEMS FOR USING A TOP OF RACK SWITCH AS AN OVERLAY ROUTING INTERMEDIATE POINT." U.S. Provisional Patent Application Ser. No. 62/535,073 is incorporated herein by reference in its entirety.

BACKGROUND

Network devices, such as routers and multilayer switches, often rewrite headers when routing packets to their destinations, and hence, are required to store any number of unique MAC addresses associated with those destinations to perform those rewrites.

SUMMARY

In general, in one aspect, the invention relates to a method for transmitting media access control (MAC) frames. The method includes receiving, by a destination network device, a first virtual extensible local area network (VXLAN) frame, decapsulating the first VXLAN frame to obtain a first MAC frame, wherein the first MAC frame originates from a source server, wherein the source server is not directly connected to the destination network device, rewriting, by the destination network device using a VM-to-VTEP (VMS2V) table, the first MAC frame to obtain a second MAC frame, determining a destination server virtual tunnel end point (VTEP) Internet Protocol (IP) address using at least a portion of the second MAC frame, generating a second VXLAN frame comprising the destination server VTEP IP address and the second MAC frame, and transmitting the second VXLAN frame to a destination server, wherein the destination server comprises a VTEP associated with the destination server VTEP IP address.

In general, in one aspect, the invention relates to a network device. The network device includes a plurality of ports, and a processor operatively connected to the plurality of ports and configured to receive, at a first port of the plurality of ports, a first virtual extensible local area network (VXLAN) frame, decapsulate the first VXLAN frame to obtain a first media access control (MAC) frame, wherein the first MAC frame originates from a source server, wherein the source server is not directly connected to the network device, rewrite, using a VM-to-VTEP (VMS2V) table, the first MAC frame to obtain a second MAC frame, determine a destination server virtual tunnel end point (VTEP) Internet Protocol (IP) address using at least a portion of the second MAC frame, generate a second VXLAN frame comprising the destination server VTEP IP address and the second MAC frame, and transmit, at a second port of the plurality of ports, the second VXLAN frame to a destination server, wherein the destination server comprises a VTEP associated with the destination server VTEP IP address.

In general, in one aspect, the invention relates to a non-transitory computer readable medium (CRM). The non-transitory CRM includes computer readable program code, which when executed by a computer processor, enables the computer processor to receive a first virtual extensible local area network (VXLAN) frame, decapsulate the first VXLAN frame to obtain a first media access control (MAC) frame, wherein the first MAC frame originates from a source server, wherein the source server is not directly connected to a destination network device on which the computer processor resides, rewrite, using a VM-to-VTEP (VMS2V) table, the first MAC frame to obtain a second MAC frame, determine a destination server virtual tunnel end point (VTEP) Internet Protocol (IP) address using at least a portion of the second MAC frame, generate a second VXLAN frame comprising the destination server VTEP IP address and the second MAC frame, and transmit the second VXLAN frame to a destination server, wherein the destination server comprises a VTEP associated with the destination server VTEP IP address.

Other aspects of the invention will be apparent from the following description and the appended claims.

BRIEF DESCRIPTION OF DRAWINGS

FIG. 5B shows an exemplary MAC frame in accordance with one or more embodiments of the invention.

FIG. 5C shows an exemplary VXLAN frame in accordance with one or more embodiments of the invention.

FIG. 5D shows an exemplary VXLAN frame in accordance with one or more embodiments of the invention.

FIG. 5E shows an exemplary MAC frame in accordance with one or more embodiments of the invention.

FIG. 5F shows an exemplary VXLAN frame in accordance with one or more embodiments of the invention.

FIG. 7A shows an exemplary north-south path of a payload transmitted using a ToR switch as an overlay routing intermediate point in accordance with one or more embodiments of the invention.

FIG. 7B shows an exemplary MAC frame in accordance with one or more embodiments of the invention.

FIG. 7C shows an exemplary VXLAN frame in accordance with one or more embodiments of the invention.

FIG. 7D shows an exemplary MAC frame in accordance with one or more embodiments of the invention.

FIG. 7E shows an exemplary VXLAN frame in accordance with one or more embodiments of the invention.

DETAILED DESCRIPTION

Figure 1:
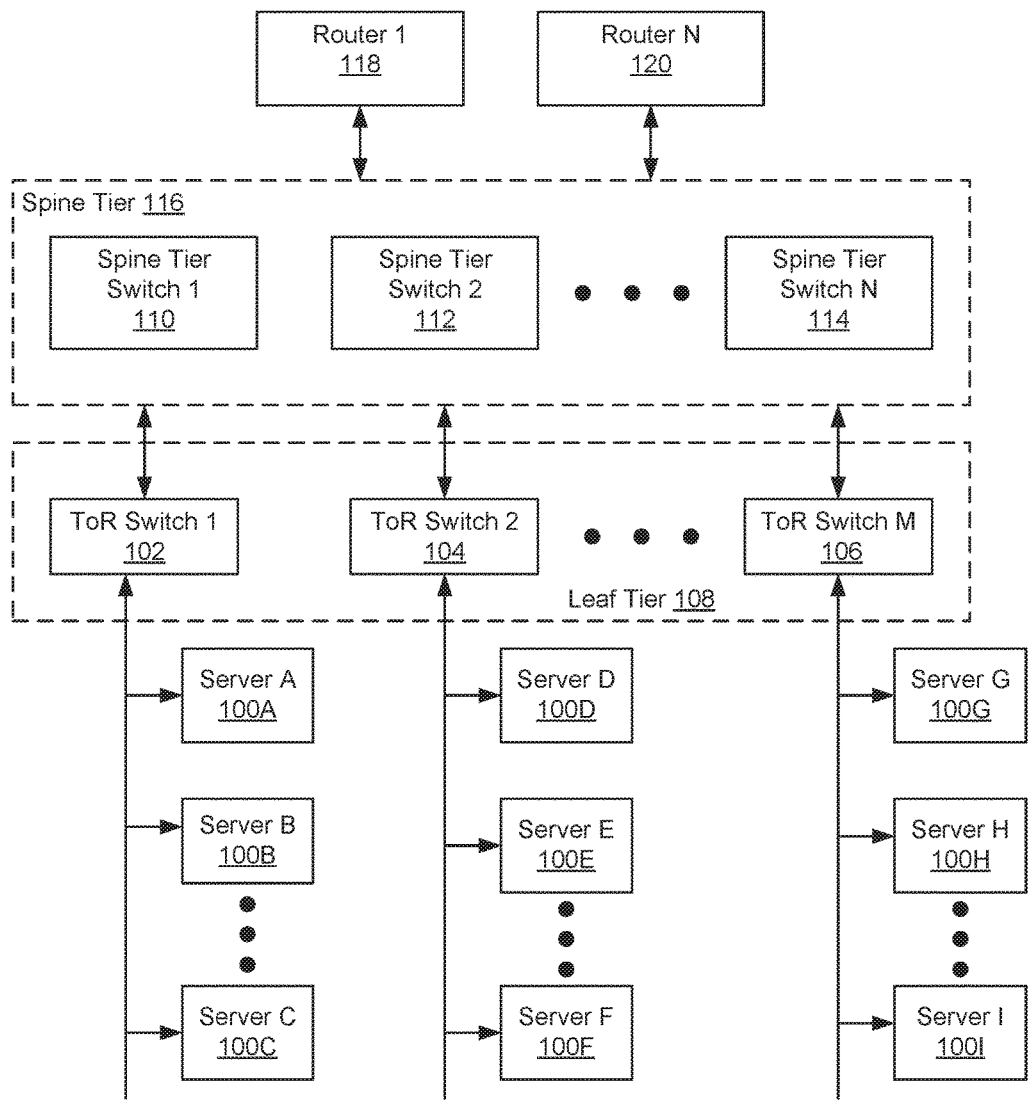
FIG. 1 shows a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-7E, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiment described with regard to a corresponding like-named component in any other figure.

In general, embodiments of the invention relate to a method for transmitting MAC frames between remote and/or virtual machines, across network devices (i.e., switches, multilayer switches, and routers) that conventionally do not hold capacity to address MAC rewrites to any and all possible destinations within expanding data centers. More specifically, embodiments of the invention permit a network device the functionality of retaining MAC rewrite table entries corresponding to Top of Rack (ToR) switches (e.g., network devices) versus to the hosts and virtual machines that reside under those ToR switches. This use of a ToR switch as an overlay routing intermediate point may reduce the number of required MAC addresses stored on a network device for the purposes of performing rewrites, thereby once again establishing the capability for packets to reach any arbitrary destination as data centers scale.

In one embodiment of the invention, the use of a ToR switch as an overlay routing intermediate point utilizes, at least in part, the VXLAN protocol. One version of the VXLAN protocol is defined in the document entitled "VXLAN: A Framework for Overlaying Virtualized Layer 2 Networks over Layer 3 Networks" version dated Aug. 9, 2014. The VXLAN protocol is hereby incorporated by reference in its entirety. The invention is not limited to a particular version of VXLAN.

In the following description, all references to specific MAC addresses, e.g., ToR switch MAC, refer to a MAC address associated with a specific component in the system, e.g., a virtual machine, a server, a ToR switch, etc. but should not be interpreted to mean that such component only has one MAC address. Rather, in various embodiments of the invention, one or more of the aforementioned components may be associated with multiple MAC addresses.

In the following description, all references to specific IP addresses, e.g., destination VM IP, refer to an IP address associated with a specific component in the system, e.g., a virtual machine, a server, a ToR switch, etc. but should not be interpreted to mean that such component only has one such IP address. Rather, in various embodiments of the invention, one or more of the aforementioned components may be associated with multiple IP addresses.

FIG. 1 shows a system in accordance with one or more embodiments of the invention. The system includes one or more servers (100A-100I), a leaf tier (108), a spine tier (116), and one or more routers (118, 120). The leaf tier and the spine tier may be collectively referred to as the IP Fabric. Further, all the aforementioned components may be co-located in the same physical location. Alternatively, the aforementioned components may not all be co-located. Additional details regarding each of the aforementioned components are provided below.

In one embodiment of the invention, a server (also referred to as a host) (100A-100I) is a computer system. A computer system may include any type of physical system that is configured to generate, send, receive, and/or process MAC frames (see e.g., FIG. 4A-7D). The computer system may also include functionality to execute one or more virtual machines, where each virtual machine may be configured to generate, send, receive, and/or process MAC frames. In one embodiment of the invention, each virtual machine corresponds to an execution environment that is distinct from the execution environment provided by the server upon which it is executing. Examples of virtual machines include, but are not limited to, Oracle® VM and VMware® Virtual Server. (Oracle is a registered trademark of Oracle International Corporation and VMware is a registered trademark of VMware, Inc.). The computer system may include a processor, memory, and one or more physical network interfaces.

Each server is directly connected to at least one Top of Rack (ToR) switch (102, 104, 106) in the leaf tier (108). In one embodiment of the invention, each server is only directly connected to a single ToR switch in the leaf tier (108). In one embodiment of the invention, the ToR switches in a leaf tier (108) are not directly connected to each other. Alternatively, if the ToR switches implement Multichassis Link Aggregation (MLAG), then a given ToR switch may be directly connected to one other ToR switch in the leaf tier and a given server may be connected to each of the ToR switches in the MLAG domain. Each of the ToR switches may include or be configured to execute one or more virtual tunnel end points (VTEP) VTEPs (see FIG. 3).

Each ToR switch in the leaf tier (108) is connected to at least one spine switch (110, 112, 114) in the spine tier (116). In one embodiment of the invention, each ToR switch is connected to every other switch in the spine tier. Further, in one embodiment of the invention, the spine switches in the spine tier (116) are not directly connected to each other. Alternatively, if the spine switches implement Multichassis Link Aggregation (MLAG), then a given spine switch may be directly connected to one other spine switch in the spine tier.

In one embodiment of the invention, each leaf switch and each spine switch is a physical device that includes persistent storage, memory (e.g., Random Access Memory), one or more processors, and two or more physical ports. Each port may be connected to either: (i) a computer system (described above), or (ii) a network device (i.e., any device that is part of the network infrastructure such as a leaf switch or ToR switch, a spine switch, or a router). Each switch (leaf switch and spine switch) is configured to receive VXLAN frames and/or MAC frames via the ports and, in one or more embodiments of the invention, determine whether to process the VXLAN frames and/or MAC frames in accordance with the methods described below in FIGS. 4A-4D and 6A-6C. In one embodiment of the invention, a network device may be a switch, a router, or a multilayer switch.

Figure 3:
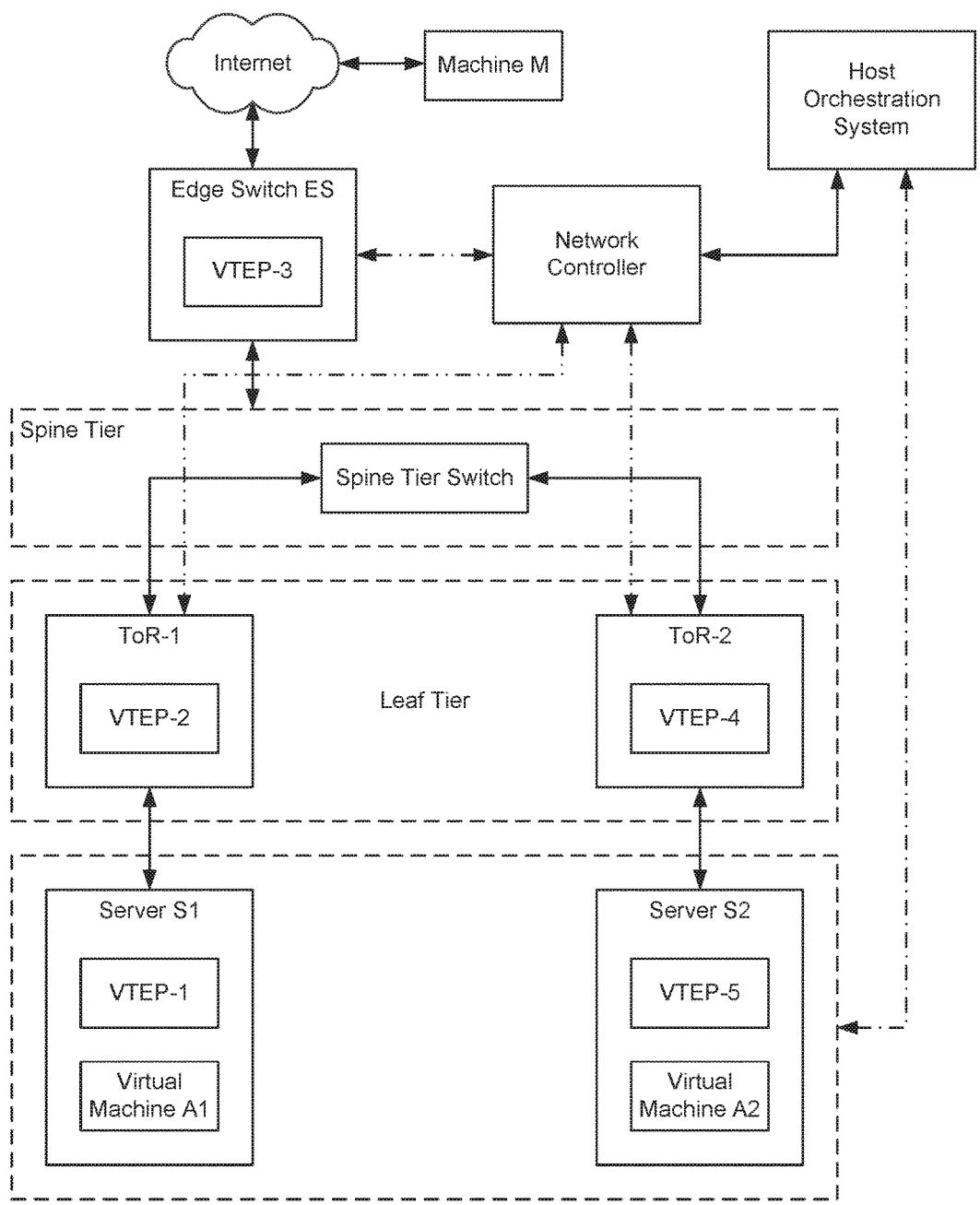
FIG. 3 shows an exemplary system in accordance with one or more embodiments of the invention.

Continuing discussion of FIG. 1, the spine switches may be directly connected to one or more routers (118, 120) or may be indirectly connected to one or more routers (see FIG. 3). In the latter scenario, the spine switches may be connected to one or more edge switches (not shown in FIG. 1) that, in turn, are directly connected to one or more routers (118, 120).

In one embodiment of the invention, the routers (118, 120) are configured to receive MAC frames from other networks (e.g., the Internet) and route the MAC frames towards the appropriate server (100A-100I). In one embodiment of the invention, each router includes a number of physical ports (hereafter ports) and is configured to receive MAC frames via the ports and determine whether to (i) drop the MAC frame, or (ii) send the MAC frame out over another one of the ports on the switch. The router uses the destination Internet Protocol (IP) address in the received MAC frame along with a routing table to determine out of which ports to send the MAC frame.

Figure 2A:
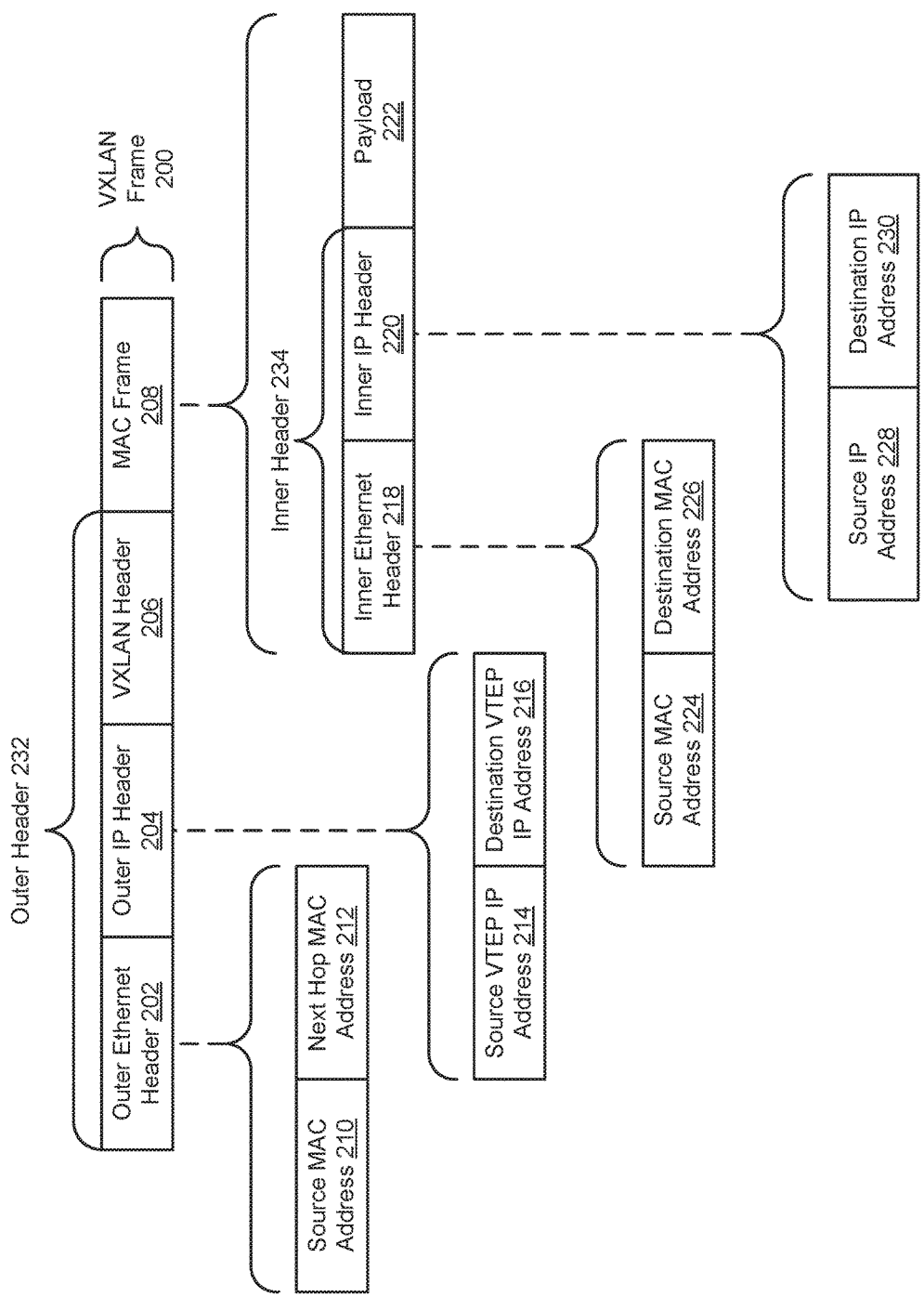
FIG. 2A shows a VXLAN frame in accordance with one or more embodiments of the invention.

FIG. 2A shows a VXLAN frame in accordance with one or more embodiments of the invention. The VXLAN frame (200) includes: (i) a MAC frame (208), (ii) a VXLAN header (206), (iii) an outer IP header (204), and (iv) and outer Ethernet header (202). Each of the aforementioned components is described below.

In one embodiment of the invention, the MAC frame (208) is generated by a source host or virtual machine and may include an inner header (234) and a payload (222). The payload (222) may include the content that the source host or virtual machine is attempting to transmit to the destination host or virtual machine. The inner IP header (220) includes a source IP address (228) and a destination IP address (230). The MAC frame may include other information/content without departing from the invention.

In one embodiment of the invention, the VXLAN header (206) may include, but is not limited to, a virtual network identifier (VNI). The VNI scopes the MAC frame (208) originated by the host or virtual machine such that the MAC frame (208) may only be received by destination servers or virtual machines associated (via a VTEP) with the same VNI. The VXLAN header may include other information/content without departing from the invention.

In one embodiment of the invention, the outer Ethernet header (202) and the outer IP header (204) are used to route the VXLAN frame from the source VTEP to the destination VTEP. To this end, the outer Ethernet header (202) includes the source MAC address (210) and the next hop MAC address (212), and the outer IP header (204) includes the source VTEP IP address (214) and the destination VTEP IP address (216). The aforementioned components may include other information/content without departing from the invention. The outer Ethernet header (202), the outer IP header (204), and the VXLAN header (206) may be collectively referred to as an outer header (232).

The VXLAN frame may include other components without departing from the invention.

Figure 2B:
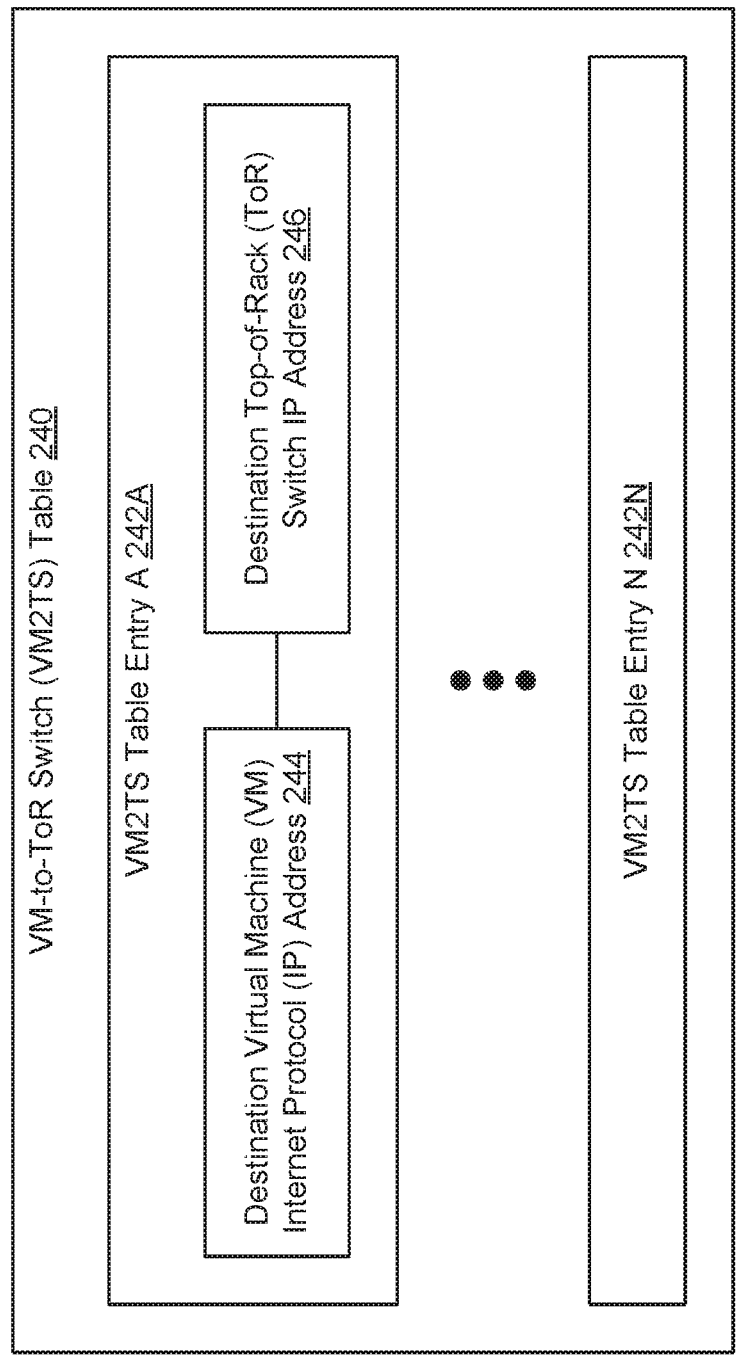
FIG. 2B shows a VM-to-ToR Switch Table in accordance with one or more embodiments of the invention.

FIG. 2B shows a VM-to-ToR Switch Table in accordance with one or more embodiments of the invention. The VM-to-ToR Switch (VM2TS) Table (240) may be a data repository for storing and mapping destination virtual machines to corresponding destination ToR switches. As a data repository, the VM2TS Table (240) may take the form of any type of storage unit and/or device such as, for example, a file system, a database, a collection of tables, or any other storage medium. Further, the VM2TS Table (240) may include multiple different storage units and/or devices. In one embodiment of the invention, the VM2TS Table (240) may be programmed by a network controller and/or host orchestration system (see e.g., FIG. 3) and provided to the various switches (e.g., edge switches, ToR switches, etc.) residing in a network.

In one embodiment of the invention, the VM2TS Table (240) may include one or more VM2TS Table entries (242A-242N). Each VM2TS Table entry (242A-242N) may include a destination VM IP address (244) and a destination ToR switch IP address (246). In one embodiment of the invention, the mapping presented in each VM2TS Table entry (242A-242N) identifies a destination ToR switch as an overlay routing intermediate point, under which a given destination VM resides.

Figure 2C:
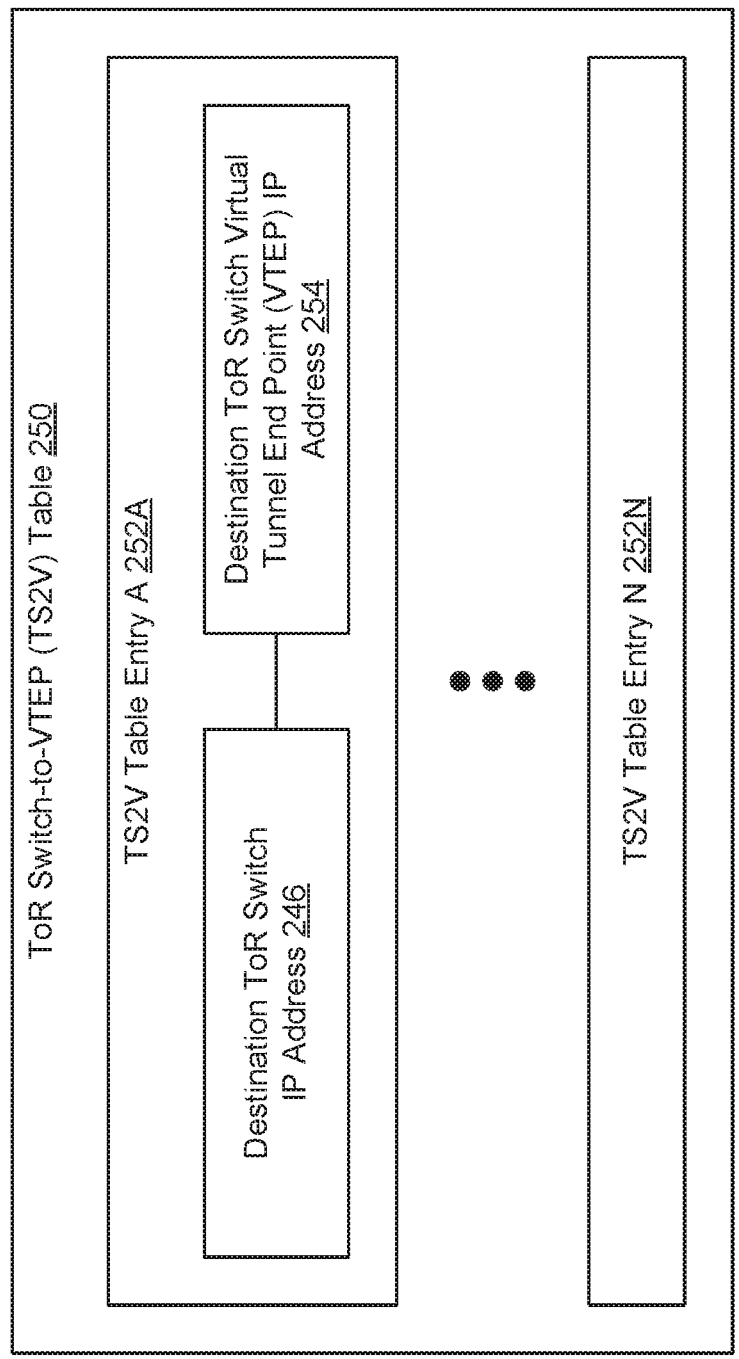
FIG. 2C shows a ToR Switch-to-VTEP Table in accordance with one or more embodiments of the invention.

FIG. 2C shows a ToR Switch-to-VTEP Table in accordance with one or more embodiments of the invention. The ToR Switch-to-VTEP (TS2V) Table (250) may be a data repository for storing and mapping destination ToR switches to corresponding VTEPs. As a data repository, the TS2V Table (250) may take the form of any type of storage unit and/or device such as, for example, a file system, a database, a collection of tables, or any other storage medium. Further, the TS2V Table (250) may include multiple different storage units and/or devices. In one embodiment of the invention, the TS2V Table (250) may be programmed by the network controller and/or host orchestration system (see e.g., FIG. 3) and provided to the various switches (e.g., edge switches, ToR switches, etc.) residing in a network.

In one embodiment of the invention, the TS2V Table (250) may include one or more TS2V Table entries (252A-252N). Each TS2V Table entry (252A-252N) may include a destination ToR switch IP address (246) and a destination ToR switch VTEP IP address (254). In one embodiment of the invention, the mapping presented in each TS2V Table entry (252A-252N) identifies the VTEP corresponding to a given ToR switch.

Figure 2D:
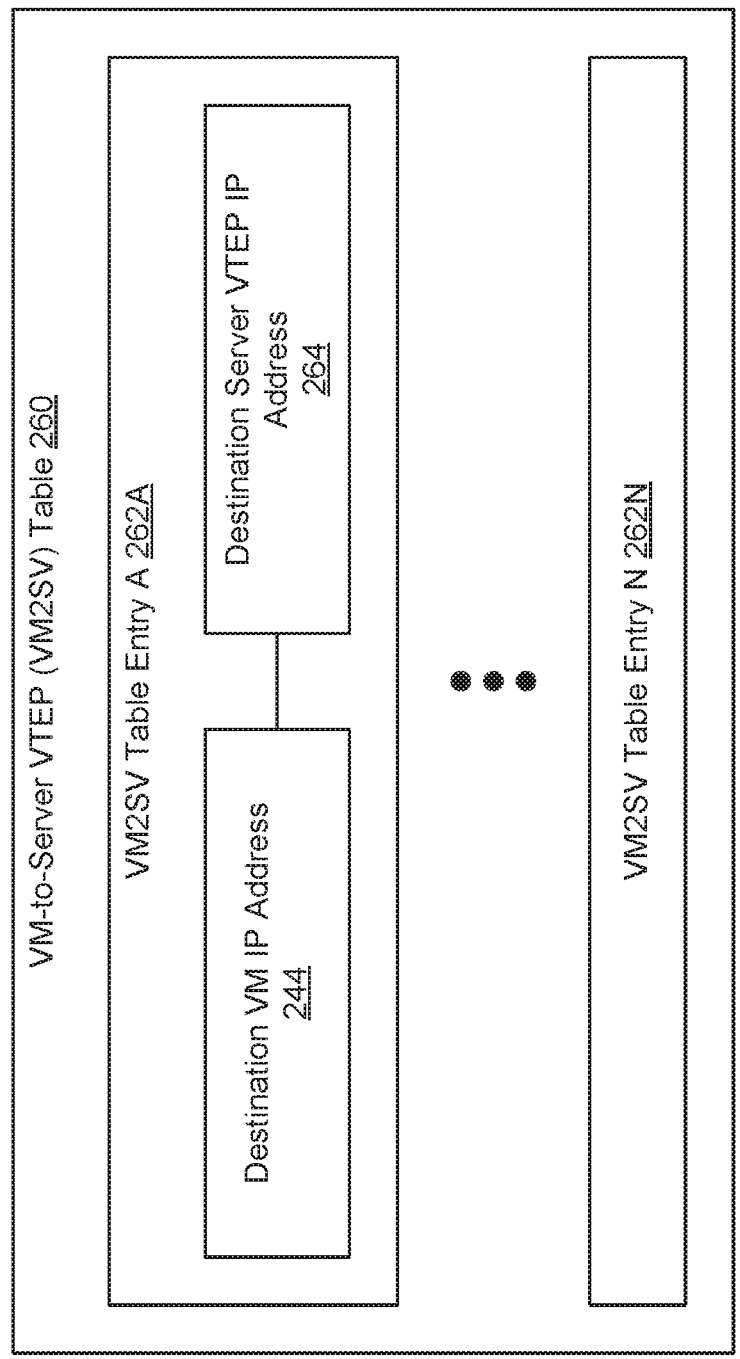
FIG. 2D shows a VM-to-Server VTEP Table in accordance with one or more embodiments of the invention.

FIG. 2D shows a VM-to-Server VTEP Table in accordance with one or more embodiments of the invention. The VM-to-VTEP Server (VM2VS) Table (260) may be a data repository for storing and mapping destination virtual machines to corresponding destination servers/hosts. As a data repository, the VM2VS Table (260) may take the form of any type of storage unit and/or device such as, for example, a file system, a database, a collection of tables, or any other storage medium. Further, the VM2VS Table (260) may include multiple different storage units and/or devices. In one embodiment of the invention, the VM2VS Table (260) may be programmed by the network controller and/or host orchestration system (see e.g., FIG. 3) and provided to the various ToR switches residing in a network.

In one embodiment of the invention, the VM2VS Table (260) may include one or more VM2S Table entries (262A-262N). Each VM2S Table entry (262A-262N) may include a destination VM IP address (244) and a destination server IP address (264). In one embodiment of the invention, the mapping presented in each VM2SV Table entry (262A-262N) identifies a destination server VTEP IP address for a VTEP executing on the server/host on which a given destination VM resides.

FIG. 3 shows an exemplary system in accordance with one or more embodiments of the invention. The invention is not limited to the system shown in FIG. 3. Turning to FIG. 3, the system includes two servers (Server S1 and Server S2), where each of the servers include a virtual machine and a VTEP. Specifically, server S1 includes virtual machine A1 and VTEP-1, whereas server S2 includes virtual machine A2 and VTEP-5. In one embodiment of the invention, each server and virtual machine is associated with its own Internet Protocol (IP) address and its own media access control (MAC) address. Furthermore, each VTEP on a server/host (e.g., server S1 or server S2) is associated with the IP address and MAC address of the server/host on which the VTEP resides.

Continuing with the discussion of FIG. 3, server S1 is directly connected to ToR switch 1 and server S2 is directly connected to ToR switch 2. In this example, each server is only connected to a single ToR switch. Each ToR switch (ToR switch 1 and ToR switch 2) includes a VTEP (VTEP 2 and VTEP 4). Each of the ToR switches is directly connected to a spine switch in the spine tier. The spine tier switch is, in turn, directly connected to an edge switch, where the edge switch includes a VTEP (VTEP 3). Further, the edge switch and a remote machine (Machine M) are operatively connected via the Internet. In one embodiment of the invention, each VTEP on a network switch (e.g., ToR switch 1 or edge switch) is associated with the IP address and MAC address of the network switch on which it is located. Further, all VTEPs in the exemplary system are associated with one VXLAN, henceforth one VNI.

The exemplary system further includes a network controller, which may be operatively connected to one or more network switches (e.g., edge switch ES, ToR-1 and ToR-2 switches) in the network or datacenter. In one embodiment of the invention, the network controller may be a computing device that manages a set of network switches. A computing device may be any physical device, virtual device, or any combination thereof. By way of an example, the network controller may be a server (i.e., a device with at least one or more processor(s), memory, and an operating system). Alternatively, in one embodiment of the invention, the network controller may be a special purpose computing device that includes one or more application-specific processor(s). Further, in one embodiment of the invention, the network controller may correspond to a virtual machine executing on a physical device such as a server.

In one embodiment of the invention, the network controller includes executable instructions (stored in a non-transitory computer readable medium (not shown)), which when executed by one or more processor(s), enable the network controller to: (i) monitor and manage the one or more network switches in the network or datacenter; (ii) receive, consolidate, and/or share state information pertaining to the one or more network switches; and (iii) communicate with the host orchestration system (described below). In one embodiment of the invention, the network controller may include a state database (not shown), which may serve as a repository for consolidating state information pertaining to the one or more network switches. The aforementioned state database may be implemented using any type of database (e.g., a relational database, a distributed database, etc.). In one embodiment of the invention, the state database may be implemented in-memory (i.e., the contents of which may be maintained in volatile memory). Alternatively, the state database may be implemented using persistent storage.

In one embodiment of the invention, the state information (pertaining to the one or more network switches in the network or datacenter) that is stored in the network controller may include, but is not limited to: (i) information about any services currently executing on each network switch; (ii) the version of any software executing on each network switch; (iii) the version of any firmware on each network switch; (iv) hardware version information for any hardware included in each network switch; (v) configuration and status information about (and/or obtained using) any protocols (e.g., link layer discovery protocol (LLDP), multi-chassis link aggregation (MLAG), virtual local area network (VLAN), VXLAN, virtual address resolution protocol (VARP), etc.) or features executing on each network switch; and (vi) the various mappings necessary to embodiments of the invention (see e.g., FIGS. 2B-2D). The network controller may include other information without departing from the scope of the invention.

In one embodiment of the invention, the state information consolidated in the network controller may be shared with the one or more network switches in the network or datacenter. The sharing of state information may be implemented using an asynchronous replication mechanism. More specifically, when state information is changed in the network controller, the changed state information may first be stored in the state database residing in the network controller, and then a copy of the changed state information may be transmitted to the one or more network switches. Conversely, the change of state information on a network switch may be transmitted to the network controller through the same mechanism.

In one embodiment of the invention, a network switch (e.g., ToR switches) may share or publish the hosts and/or virtual machines that which are directly connected to the network switch. In sharing or broadcasting this information, the network switch may reduce the number of rewrites other network switches of the network or datacenter may require to route network packets to those above-mentioned hosts and/or virtual machines. Further, in sharing or broadcasting this information, the network switch may identify itself as an overlay routing intermediate point to which network packets may be addressed/tunneled to ultimately reach a given host and/or virtual machine.

Proceeding with FIG. 3, the exemplary system may further include a host orchestration system. In one embodiment of the invention, the host orchestration system may be a platform for the centralized management and deployment of virtual machines executing on servers/hosts in a network or datacenter. The host orchestration system may include hardware, software, firmware, or any combination thereof. In one embodiment of the invention, the host orchestration system may include functionality to: (i) track the creation and deletion (and therefore manage the deployment) of virtual machines executing on servers/hosts in a network or datacenter; (ii) generate, manage/update, and store mappings pertinent to embodiments of the invention (see e.g., FIGS. 2B-2D); and (iii) communicate with the network controller.

In one embodiment of the invention, the host orchestration system may include further functionality to communicate with one or more servers/hosts in the network or datacenter. In such an embodiment, one or more servers/hosts may publish network switch (e.g., ToR switch) IP addresses, which the host orchestration system may use towards implementing above-mentioned functionality (ii). In one embodiment of the invention, a network switch (initiating/using LLDP) may relay its IP address to one or more servers/hosts that which are directly connected to the network switch. The one or more servers/hosts may subsequently provide the network switch IP address to the host orchestration system.

In one embodiment of the invention, the host orchestration system may include a data repository (not shown). The data repository may be any type of storage unit and/or device (e.g., a file system, database, collection of tables, or any other storage mechanism) for storing data. Further, the data repository may include multiple different storage units and/or devices. The multiple different storage units and/or devices may or may not be located at the same physical site. In one embodiment of the invention, the data repository may include functionality to store any mappings pertinent to embodiments of the invention (see e.g., FIGS. 2B-2D).

The aforementioned system is used to describe various embodiments of the invention. Specifically, the aforementioned system is used to illustrate the different embodiments of using a ToR switch as an overlay routing intermediate point. However, the invention is not limited to the system shown in FIG. 3.

FIGS. 4A-4D show flowcharts describing a method for using a ToR switch as an overlay routing intermediate point in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. In one embodiment of the invention, the steps shown in FIGS. 4A-4D may be performed in parallel with other steps shown in FIGS. 4A-4D without departing from the invention.

With reference to the example system portrayed in FIG. 3, the method outlined in FIGS. 4A-4D describes the use of ToR switch 2 (also referred to as a destination ToR switch) as an overlay routing intermediate point to reduce the required number of unique MAC addresses organized as the limited entries in the MAC rewrite table on ToR switch 1 (hereafter referred to as a source ToR switch). From the perspective of virtual machine A1, virtual machine A1 is not aware of the VXLAN protocol or of any overlay routing mechanisms; rather, virtual machine A1 operates as if it can communicate directly with virtual machine A2 using conventional routing mechanisms.

Figure 4A:
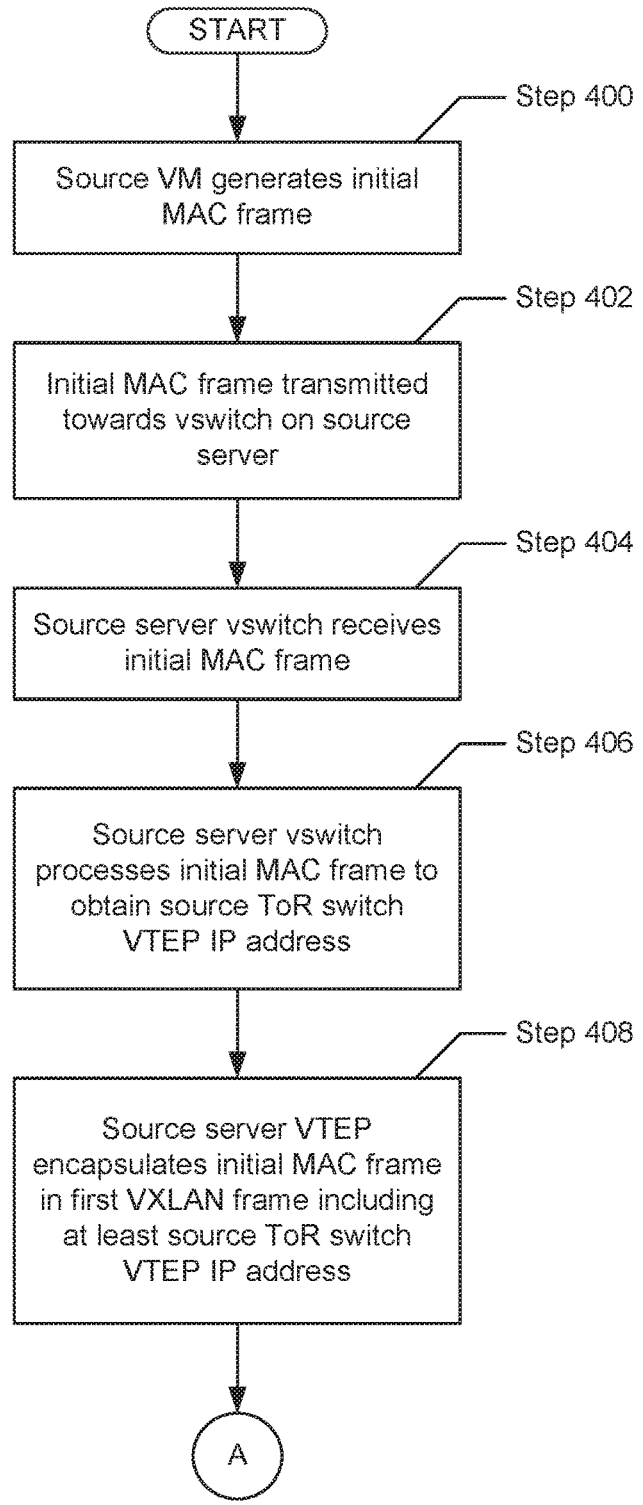
FIGS. 4A-4D show flowcharts describing a method for using a ToR switch as an overlay routing intermediate point in accordance with one or more embodiments of the invention.

Turning to FIG. 4A, in Step 400, the source VM (i.e., VM A1) generates an initial MAC frame. In one embodiment of the invention, the initial MAC frame may at least include: (i) the source VM MAC address as the source MAC address; (ii) the source ToR switch (i.e., ToR switch 1) MAC address as the destination MAC address; (iii) the source VM IP address as the source IP address; and (iv) the destination VM (i.e., VM A2) IP address as the destination IP address. In one embodiment of the invention, the source VM may obtain the source ToR switch MAC address (to include in the initial MAC frame) by issuing an ARP request. In Step 402, the initial MAC frame (generated in Step 400) is transmitted towards a virtual switch (also referred to as a vswitch) and/or hypervisor on the source server.

In Step 404, the source server's vswitch receives the aforementioned initial MAC frame. Again, the source server is the server upon which the source VM is executing. Further, the source server is executing a virtual switch (vswitch). In Step 406, the source server vswitch processes the initial MAC frame to obtain the source ToR switch VTEP IP address. In one embodiment of the invention, processing of the initial MAC frame may first entail examination of the inner header, and particularly, the destination IP address. Afterwards, the destination IP address may be used to perform a lookup in the vswitch routing table. As a result, the lookup may identify the source ToR switch VTEP IP address.

In Step 408, the source server VTEP encapsulates the initial MAC frame within a first VXLAN frame (see e.g., FIG. 2A). In one embodiment of the invention, the first VXLAN frame may include an outer header with the following information: (i) the source server MAC address as the source MAC address; (ii) the source ToR switch MAC address as the destination MAC address; (iii) the source server VTEP IP address as the source IP address; (iv) the source ToR switch VTEP IP address (ascertained in Step 406) as the destination IP address; and (v) a VNI (e.g., VNI A which is associated with VXLAN A). Moreover, the destination IP address in the outer header corresponds to a destination (i.e., ToR switch 1) for the first VXLAN frame that includes the VTEP that will decapsulate the first VXLAN frame.

Figure 4B:
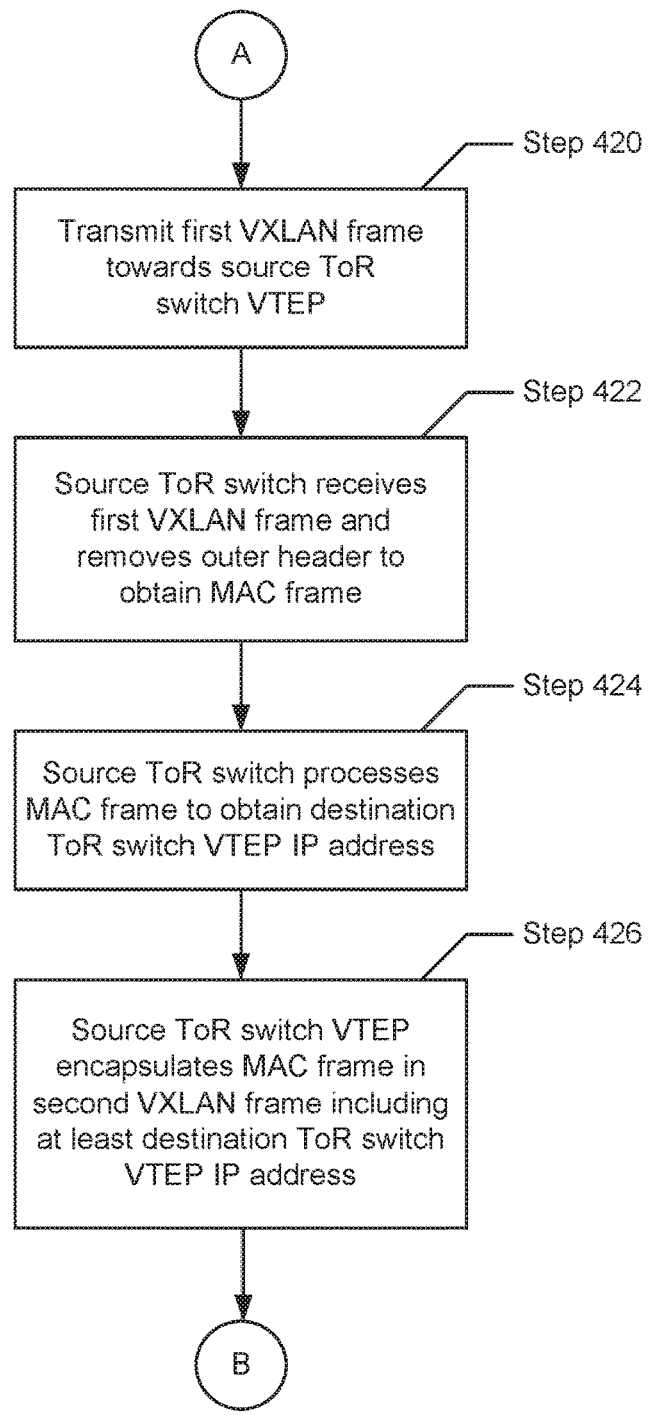

Turning to FIG. 4B, in Step 420, the first VXLAN is transmitted towards the source ToR switch VTEP. In Step 422, the source ToR switch receives the first VXLAN frame. In one embodiment of the invention, the source ToR switch subsequently removes the outer header (e.g., decapsulates the first VXLAN frame) to obtain the initial MAC frame within. In one embodiment of the invention, the first VXLAN frame is trapped and decapsulated because the first VXLAN frame includes the source ToR switch VTEP IP address as the destination IP address in the outer IP header. Further, in Step 424, the source ToR switch processes the initial MAC frame to obtain a VTEP IP address associated with the ToR switch (i.e., ToR Switch 2) directly connected to the destination server (hereafter referred to as a destination ToR switch). The destination server is the server upon which the destination VM (i.e., VM A2) is executing. In one embodiment of the invention, processing of the initial MAC frame may first entail examination of the inner header, and particularly, the destination IP address. Afterwards, the destination IP address (i.e., a destination VM IP address) may be used to perform a lookup in the VM2TS and TS2V tables (see e.g., FIGS. 2B and 2C). As a result, the lookup may identify the destination ToR switch VTEP IP address.

In one embodiment of the invention, the source ToR switch obtains the VTEP IP address necessary to reach the destination VM through any of a number of mechanisms. Examples include, but are not limited to, through the network controller and/or host orchestration system discussed above with respect to FIG. 3. As discussed above, mappings pertinent to embodiments of the invention (see e.g., FIGS. 2B-2D) may be shared with the various network switches in a network or datacenter by the network controller and/or host orchestration system. Further, the information necessary to generate and maintain these mappings may be acquired through, for example, initiation of the Link Layer Discovery Protocol (LLDP), which enables network devices the functionality of sharing their identity, capabilities, and neighbors with one another.

In one embodiment of the invention, the source ToR switch may not perform any rewriting of the initial MAC frame; rather, the rewriting of the initial MAC frame is performed by the destination ToR switch (see e.g., Step 446). Because the source ToR switch does not need to perform a MAC rewrite, the source ToR switch does not need to store the MAC addresses for any servers or virtual machines that are directly connected to other ToR switches in the network. This results in a fewer entries in the MAC rewrite table on the source ToR switch. More specifically, the source ToR switch may include in its MAC rewrite table only entries for other ToR switches (i.e., destination ToR switches), beneath which destination servers and/or virtual machines lie.

In one embodiment of the invention, in order to identify the correct destination ToR switch, the source ToR switch uses information in the inner header of the initial MAC frame to identify the destination ToR switch (i.e., the ToR switch that is directly connected to the ultimate destination (i.e., a server or a virtual machine executing on a server)). The ToR switches may include functionality to share any information that is necessary in order for the ToR switches to perform embodiments of the invention. More specifically, the aforementioned information may include IP addresses and/or MAC addresses for servers directly connected to each ToR switch and/or IP addresses and/or MAC addresses for virtual machines executing on servers directly connected to each ToR switch. Using this information, each ToR switch may include mappings (see e.g., FIGS. 2B and 2C) that allow for the selection of the appropriate VTEP IP address (i.e., the IP address of the VTEP executing on the destination ToR switch) using the IP address and/or the MAC address in the initial MAC frame.

Continuing discussion of FIG. 4B, in step 426, the source ToR switch VTEP encapsulates the initial MAC frame within a second VXLAN frame. More specifically, in one embodiment of the invention, the second VXLAN frame includes an outer header with the following information: (i) the source ToR switch MAC address as the source MAC address; (ii) the next hop MAC address as the destination MAC address; (iii) the source ToR switch VTEP IP address as the source IP address; (iv) the destination ToR switch VTEP IP address (ascertained in Step 424) as the destination IP address; and (v) a VNI (i.e., VNI A, which is associated with VXLAN A). Moreover, the destination IP address in the outer header corresponds to a destination for the second VXLAN frame (i.e., ToR switch 2) that includes the VTEP that will decapsulate the second VXLAN frame.

Figure 4C:
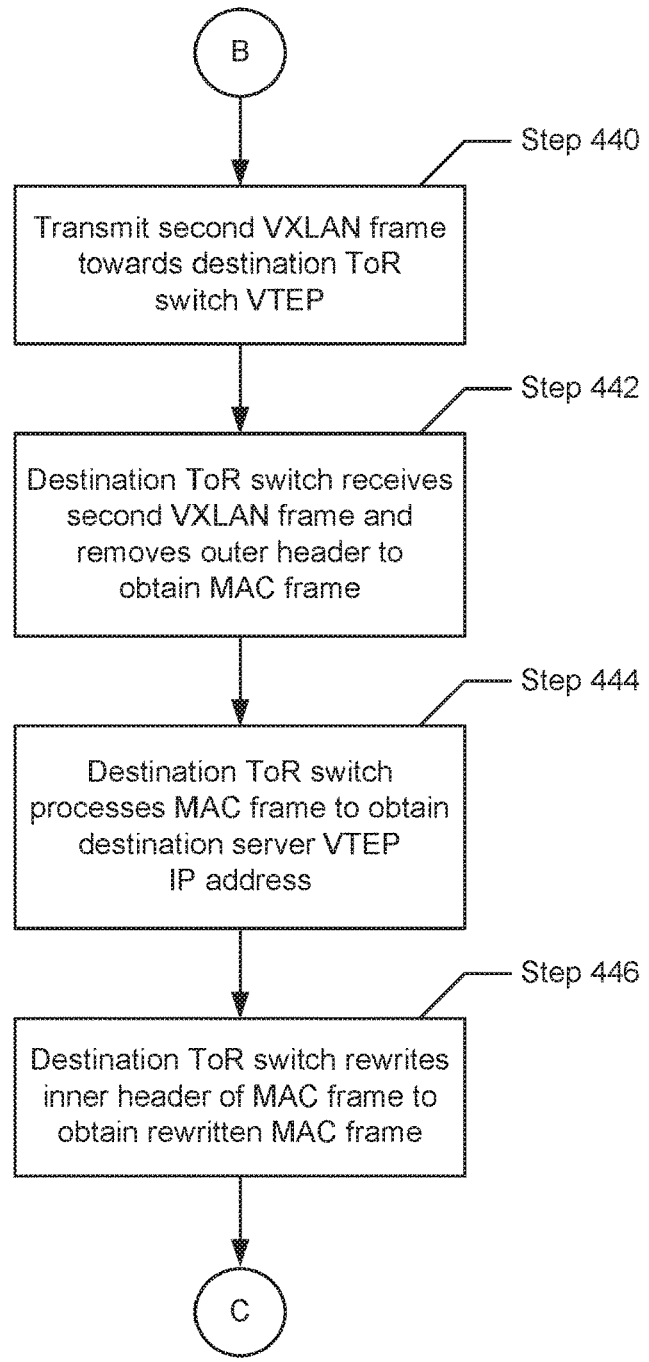

Turning to FIG. 4C, in step 440, the second VXLAN frame (generated in Step 426) is transmitted, via the IP Fabric, towards the VTEP on the destination ToR switch. The second VXLAN frame is transmitted in accordance with standard IP routing mechanisms through the IP Fabric until it reaches the destination ToR switch. In this example, the second VXLAN frame is transmitted to the Spine Tier Switch from ToR Switch 1, and the Spine Tier Switch subsequently transmits the second VXLAN frame to ToR Switch 2. Those skilled in the art will appreciate that the outer Ethernet header of the second VXLAN frame is rewritten at each hop in the IP Fabric until the second VXLAN frame reaches the destination ToR switch.

In Step 442, the VTEP on the destination ToR switch receives the second VXLAN frame. In one embodiment of the invention, the destination ToR switch subsequently removes the outer header (i.e., decapsulates the second VXLAN frame) to obtain the initial MAC frame within. In one embodiment of the invention, the second VXLAN frame is trapped and decapsulated because the second VXLAN frame includes the destination ToR switch VTEP IP address as the destination IP address in the outer IP header.

In Step 444, the destination ToR switch processes the initial MAC frame to obtain the destination server VTEP IP address. In one embodiment of the invention, processing of the initial MAC frame may first entail examination of the inner header, and particularly, the destination IP address. Afterwards, the destination IP address (i.e., a destination VM IP address) may be used to perform a lookup in the VM2SV table (see e.g., FIG. 2D). As a result, the lookup may identify the destination server VTEP IP address. In another embodiment of the invention, the destination ToR switch may examine the rewritten MAC frame (discussed below), rather than the initial MAC frame, to obtain the destination server VTEP IP address. Similarly, the destination server VTEP IP address may be obtained using the aforementioned tables and a destination VM IP address specified in the rewritten MAC frame.

In Step 446, the initial MAC frame received in the second VXLAN frame, is rewritten (thus obtaining a rewritten MAC frame) to remove the source ToR switch MAC address as the destination MAC address, thereby replacing it with the destination VM A2 MAC address. Further, the source MAC address in the initial MAC frame may be replaced with the destination ToR switch MAC address (see e.g., FIG. 5E). As discussed above, the destination ToR switch includes a MAC rewrite table that includes entries for each directly connected server and/or virtual machine executing on each directly connected server. Accordingly, all or a portion of the inner header in the initial MAC frame may be used to identify the appropriate entry in the MAC rewrite table on the destination ToR switch. The inner header of the initial MAC frame is then rewritten to include the MAC address of the virtual machine that is the ultimate destination of the payload in the initial MAC frame (see e.g., FIGS. 5B-5F).

Figure 4D:
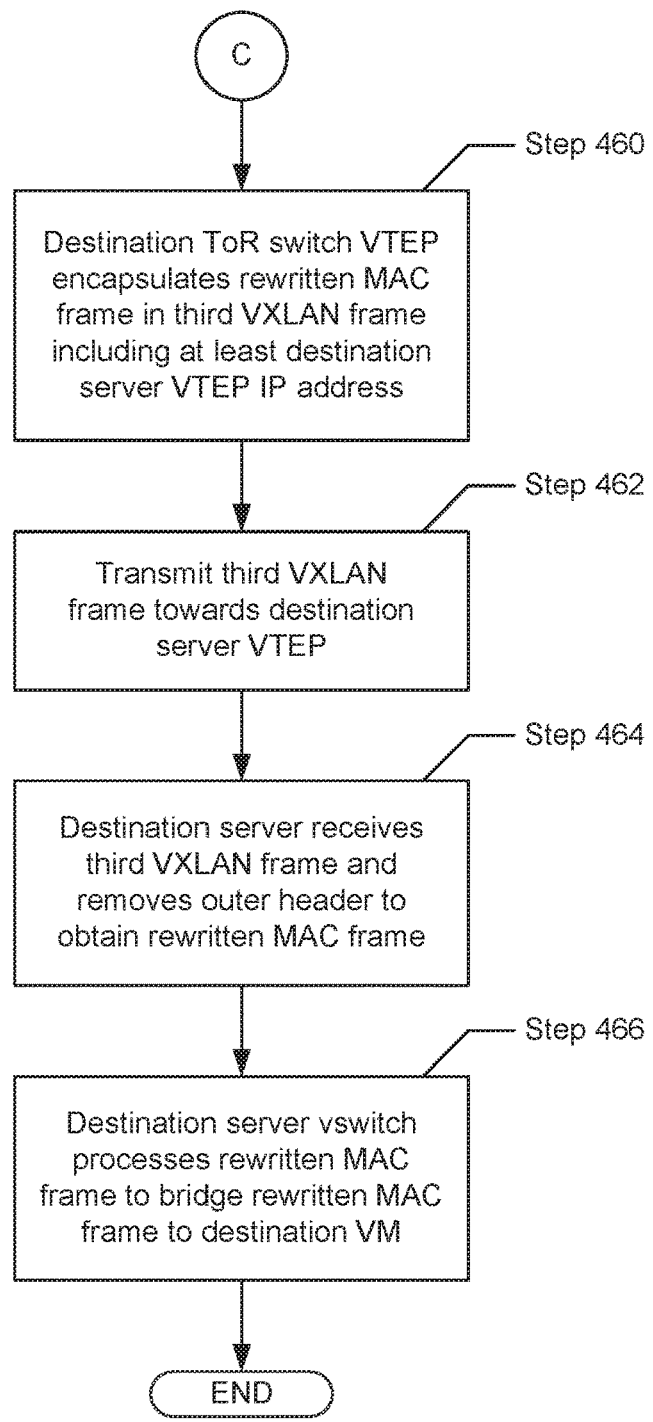

Turning to FIG. 4D, in Step 460, the destination ToR switch VTEP encapsulates the rewritten MAC frame within a third VXLAN frame. More specifically, in one embodiment of the invention, the third VXLAN frame includes an outer header with the following information: (i) the destination ToR switch MAC address as the source MAC address; (ii) the destination server MAC address as the destination MAC address; (iii) the destination ToR switch VTEP IP address as the source IP address; (iv) the destination server VTEP IP address (which may be the destination server IP address (ascertained in Step 444) as the destination IP address; and (v) a VNI (i.e., VNI A, which is associated with VXLAN A). Moreover, the destination IP address in the outer header corresponds to a destination for the third VXLAN frame (i.e., Server S2) that includes the VTEP that will decapsulate the third VXLAN frame.

In step 462, the third VXLAN frame is transmitted towards the destination server (i.e., Server S2). In step 464, the destination server receives the third VXLAN frame. In one embodiment of the invention, the destination server subsequently removes the outer header (e.g., decapsulates the third VXLAN frame) to obtain the rewritten MAC frame within. In Step 466, the destination server vswitch processes the rewritten MAC frame and bridges (i.e., sends using the destination MAC address in the rewritten MAC frame) the rewritten MAC frame to the destination VM. The destination VM (i.e., VM A2) subsequently processes the rewritten MAC frame and extracts the payload.

Figure 5A:
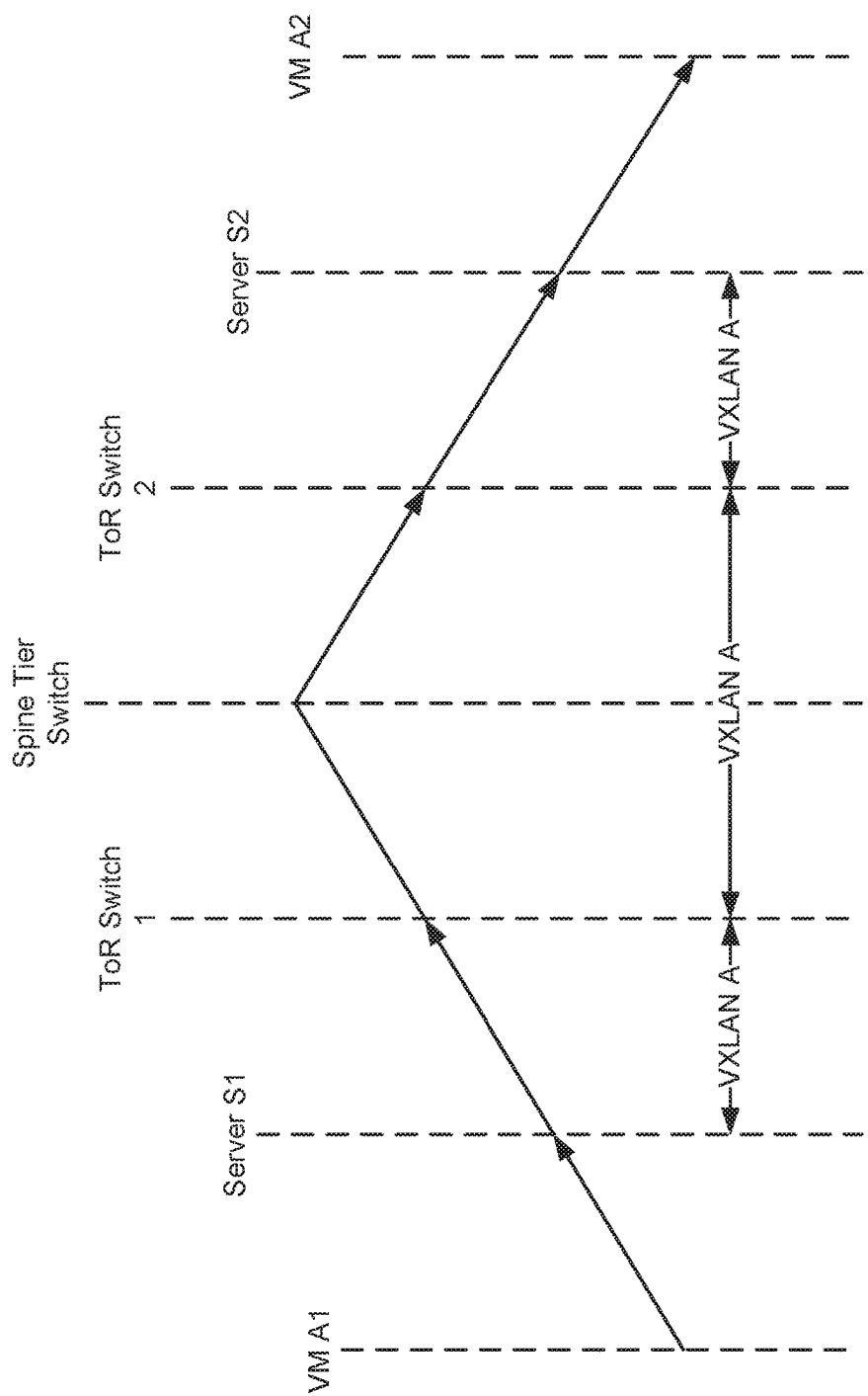
FIG. 5A shows an exemplary east-west path of a payload transmitted using a ToR switch as an overlay routing intermediate point in accordance with one or more embodiments of the invention.

FIG. 5A shows an exemplary east-west path of a payload transmitted using a ToR switch as an overlay routing intermediate point in accordance with one or more embodiments of the invention. More specifically, FIG. 5A shows an exemplary path the payload from VM A1 may take to reach VM A2. The exemplary path tracks the path described in FIGS. 4A-4D. The components shown in FIG. 5A correspond to like-named components in FIG. 3 and FIGS. 4A-4D. Turning to FIG. 5A, as described above, a first VXLAN frame encapsulating the initial MAC frame is transmitted by Server S1 to ToR Switch 1. Subsequently, a second VXLAN frame encapsulating the initial MAC frame is transmitted by ToR Switch 1 to ToR Switch 2 via the IP Fabric. Lastly, a third VXLAN frame encapsulating a rewritten MAC frame is transmitted by ToR Switch 2 to Server S2.

FIGS. 5B-5F show exemplary MAC or VXLAN frames in accordance with one or more embodiments of the invention. Specifically, FIG. 5B shows the initial MAC frame (500) as described above with respect to Step 400 of FIG. 4A. FIG. 5C shows the first VXLAN frame (502) encapsulating the initial MAC frame (500) as described above with respect to Step 408 of FIG. 4B. FIG. 5D show the second VXLAN frame (504) encapsulating the initial MAC frame (500) as described above with respect to Step 426 of FIG. 4B. FIG. 5E shows the rewritten MAC frame (506) as described above with respect to Step 446 of FIG. 4C. Lastly, FIG. 5F shows the third VXLAN frame (508) encapsulating the rewritten MAC frame (506) as described above with respect to Step 460 of FIG. 4D.

Figure 6A:
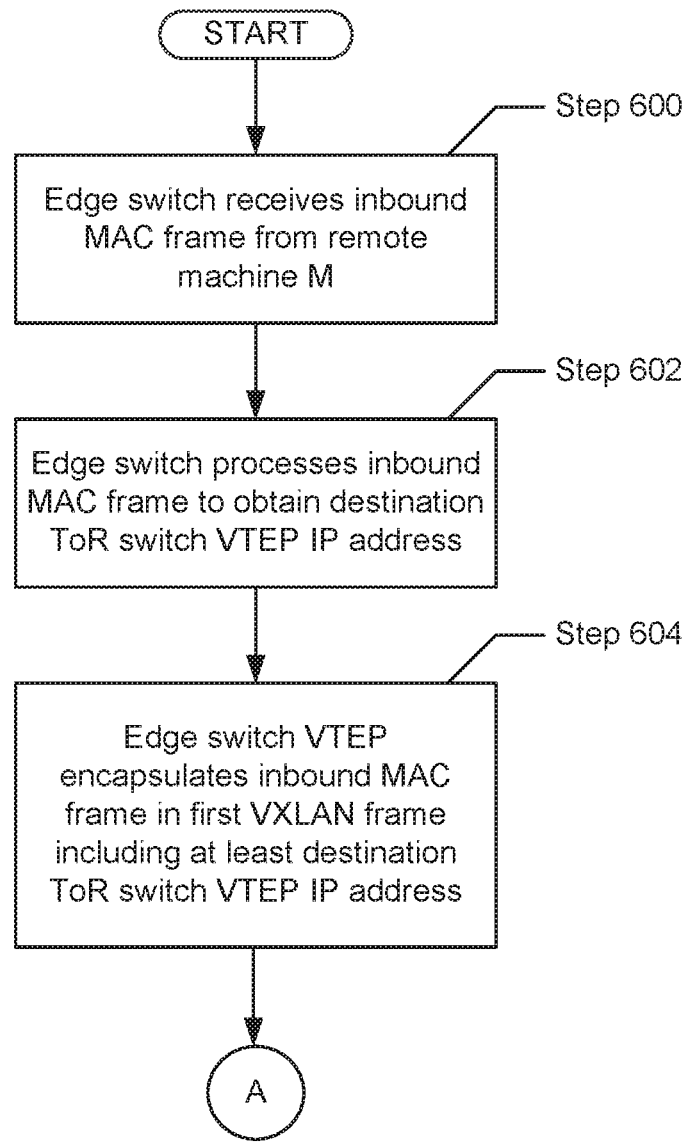
FIGS. 6A-6C show flowcharts describing a method for using a ToR switch as an overlay routing intermediate point in accordance with one or more embodiments of the invention.
Figure 6B:
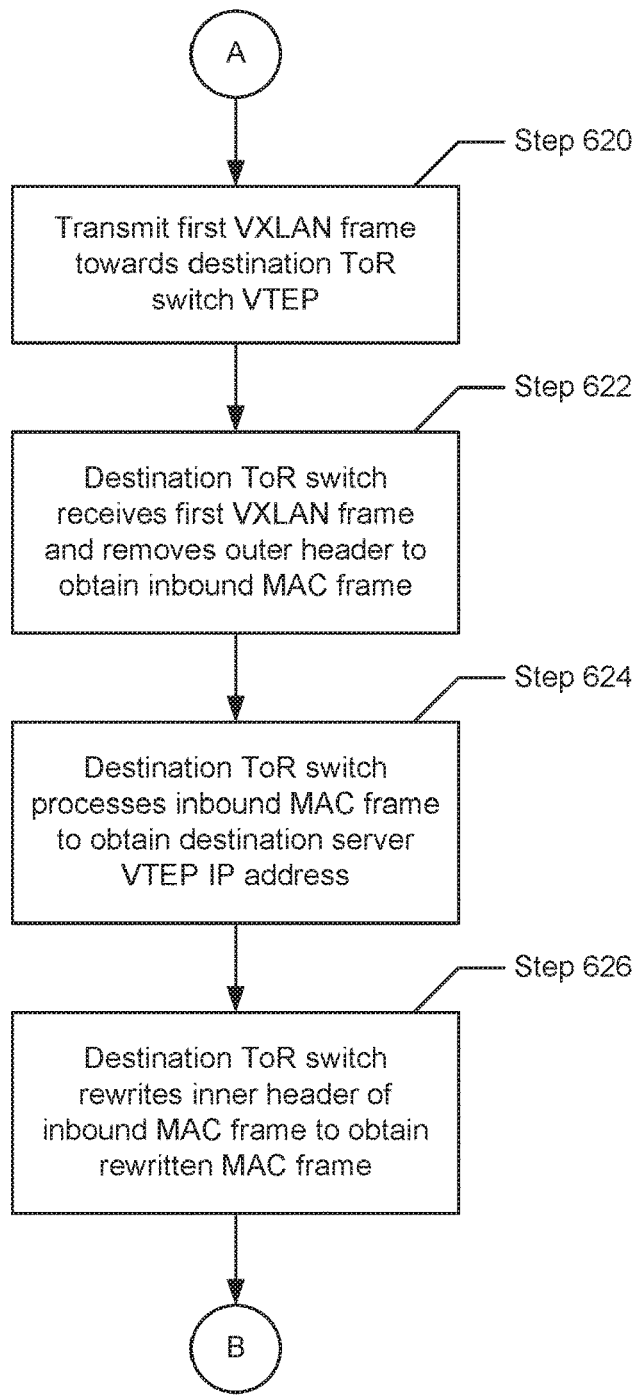
Figure 6C:
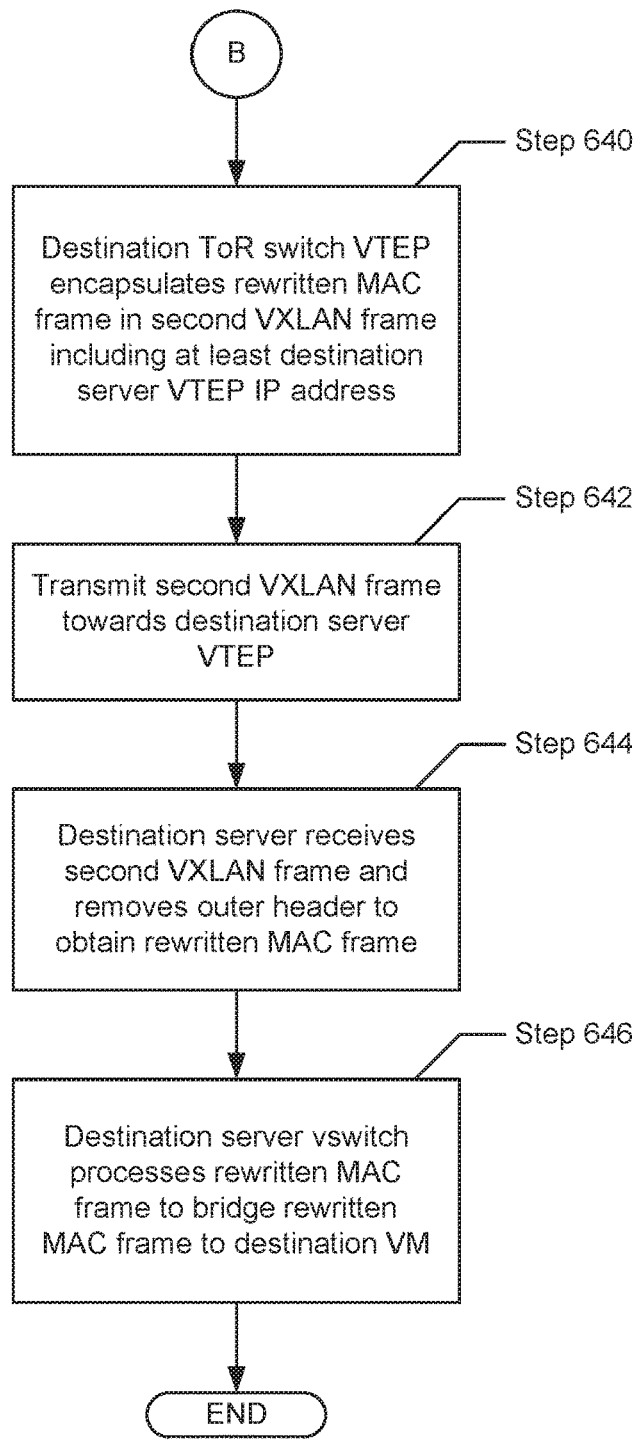

FIGS. 6A-6C show flowcharts describing a method for using a ToR switch as an overlay routing intermediate point in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. In one embodiment of the invention, the steps shown in FIGS. 6A-6C may be performed in parallel with any other steps shown in FIGS. 6A-6C without departing from the invention.

With reference to the example system portrayed in FIG. 3, the method outlined in FIGS. 6A-6C describes the use of ToR switch 2 (also referred to as a destination ToR switch) as an overlay routing intermediate point to reduce the required number of unique MAC addresses organized as the limited entries in the MAC rewrite table on the Edge Switch (hereafter referred to as a source ToR switch). From the perspective of remote machine M, remote machine M is not aware of the VXLAN protocol or of any overlay routing mechanisms; rather, remote machine M operates as if it can communicate directly with virtual machine A2 using conventional routing mechanisms.

Turning to FIG. 6A, in Step 600, the edge switch receives an inbound MAC frame from a remote machine (i.e., Machine M). The inbound MAC frame includes, at least: (i) the edge switch MAC address as the destination MAC address; (ii) the remote machine IP address as the source IP address; and (iii) the destination VM (i.e., VM A2) IP address as the destination IP address. In Step 602, the edge switch processes the inbound MAC frame to obtain a VTEP IP address associated with the ToR switch (i.e., ToR Switch 2) directly connected to the destination server (hereafter referred to as a destination ToR switch). The destination server is the server upon which the destination VM (i.e., VM A2) is executing.

In one embodiment of the invention, processing of the inbound MAC frame may first entail examination of the inner header, and particularly, the destination IP address. Afterwards, the destination IP address may be used perform a lookup in the VM2TS and TS2V tables (see e.g., FIGS. 2B and 2C). As a result, the lookup may identify the destination ToR switch VTEP IP address. In one embodiment of the invention, the source ToR switch may additionally, or alternatively, obtain the destination ToR switch VTEP IP address necessary to reach the destination VM through any of a number of mechanisms. Examples include, but are not limited to, through the network controller and/or host orchestration system discussed above with respect to FIG. 3. As discussed above, mappings pertinent to embodiments of the invention may be shared with the various network switches in a network or datacenter by the network controller and/or host orchestration system. Further, the information necessary to generate and maintain these mappings may be acquired through, for example, initiation of the Link Layer Discovery Protocol (LLDP), which enables network devices the functionality of sharing their identity, capabilities, and neighbors with one another.

In one embodiment of the invention, the edge switch may not perform any rewriting of the inbound MAC frame; rather, the rewriting of the inbound MAC frame is performed by the destination ToR switch (see e.g., Step 626). Because the edge switch does not need to perform a MAC rewrite, the edge switch does not need to store the MAC addresses for any servers or virtual machines that are directly connected to other ToR switches in the network. This results in a fewer entries in the MAC rewrite table on the edge switch. More specifically, the edge switch may include in its MAC rewrite table only entries for other ToR switches (i.e., destination ToR switches), beneath which destination servers and/or virtual machines lie.

In one embodiment of the invention, in order to identify the correct destination ToR switch, the edge switch uses information in the inner header of the inbound MAC frame to identify the destination ToR switch (i.e., the ToR switch that is directly connected the ultimate destination (i.e., a server or a virtual machine executing on a server)). The ToR switches may include functionality to share any information that is necessary in order for the ToR switches to perform embodiments of the invention. More specifically, the aforementioned information may include IP addresses and/or MAC addresses for servers directly connected to each ToR switch and/or MAC addresses for virtual machines executing on servers directly connected to each ToR switch. Using this information, each ToR switch may include mappings (see e.g., FIGS. 2B and 2C) that allow for the selection of the appropriate VTEP IP address (i.e., the IP address of the VTEP executing on the destination ToR switch) using the IP address and/or the MAC address in the initial MAC frame.

Continuing the discussion of FIG. 6A, in Step 604, the edge switch VTEP encapsulates the inbound MAC frame within a first VXLAN frame (see e.g., FIG. 2). More specifically, in one embodiment of the invention, the first VXLAN frame includes an outer header with the following information: (i) the edge switch MAC address as the source MAC address; (ii) the next hop MAC address as the destination MAC address; (iii) the edge switch VTEP IP address as the source IP address; (iv) the destination ToR switch VTEP IP address (ascertained in Step 602) as the destination IP address; and (v) a VNI (i.e., VNI B, which is associated with VXLAN B). The destination IP address in the outer header corresponds to a destination for the first VXLAN frame (i.e., ToR Switch 2) that includes the VTEP that will decapsulate the first VXLAN frame.

Turning to FIG. 6B, in Step 620, the first VXLAN frame is transmitted, via the IP Fabric, towards the VTEP on the destination ToR switch. The first VXLAN frame is transmitted in accordance with standard IP routing mechanisms through the IP Fabric until the first VXLAN frame reaches the destination ToR switch. In this example, the first VXLAN frame is transmitted to the Spine Tier Switch from Edge Switch, and the Spine Tier Switch subsequently transmits the first VXLAN frame to ToR Switch 2. Those skilled in the art will appreciate that the outer Ethernet header of the first VXLAN frame is rewritten at each hop in the IP Fabric until the first VXLAN frame reaches the destination ToR switch.

In Step 622, the VTEP on the destination ToR switch receives the first VXLAN frame. In one embodiment of the invention, the destination ToR switch subsequently removes the outer header (i.e., decapsulates the first VXLAN frame) to obtain the inbound MAC frame within. In one embodiment of the invention, the first VXLAN frame is trapped and decapsulated because the first VXLAN frame includes the destination ToR switch VTEP IP address as the destination IP address in the outer IP header.

In Step 624, the destination ToR switch processes the inbound MAC frame to obtain the destination server VTEP IP address. In one embodiment of the invention, processing of the inbound MAC frame may first entail examination of the inner header, and particularly, the destination IP address of the virtual machine. This destination IP address may be used to perform a lookup in the VM2SV table (see e.g., FIG. 2D). As a result, the lookup may identify the destination server VTEP IP address. In another embodiment of the invention, the destination ToR switch may examine the rewritten MAC frame (discussed below), rather than the inbound MAC frame, to obtain the destination server VTEP IP address. Similarly, the destination server VTEP IP address may be obtained using the aforementioned tables and a destination VM IP address specified in the rewritten MAC frame.

In Step 626, the inbound MAC frame received in the first VXLAN frame, is rewritten (thus obtaining a rewritten MAC frame) to remove the edge switch MAC address as the destination MAC address, thereby replacing it with the destination server MAC address. Further, the source MAC address in the inbound MAC frame may be replaced with the destination ToR switch MAC address (see e.g., FIG. 7D). As discussed above, the destination ToR switch includes a MAC rewrite table that includes entries for each directly connected server and/or virtual machine executing on each directly connected server. Accordingly, all or a portion of the inner header in the inbound MAC frame may be used to identify the appropriate entry in the MAC rewrite table on the destination ToR switch. The inner header of the inbound MAC frame is then rewritten to include the MAC address of a server or virtual machine that is the ultimate destination of the payload in the inbound MAC frame (see e.g., FIGS. 7B-7E).

Turning to FIG. 6C, in Step 640, the destination ToR switch VTEP encapsulates the rewritten MAC frame within a second VXLAN frame. More specifically, in one embodiment of the invention, the second VXLAN frame includes an outer header with the following information: (i) the destination ToR switch MAC address as the source MAC address; (ii) the destination server MAC address as the destination MAC address; (iii) the destination ToR switch VTEP IP address as the source IP address; (iv) the destination server VTEP IP address (ascertained in Step 624) as the destination IP address; and (v) a VNI (i.e., VNI B, which is associated with VXLAN B). Moreover, the destination IP address in the outer header corresponds to a destination for the second VXLAN frame (i.e., Server S2) that includes the VTEP that will decapsulate the second VXLAN frame.

In Step 642, the second VXLAN frame is transmitted towards the destination server (i.e., Server S2). In step 644, the destination server receives the second VXLAN frame. In one embodiment of the invention, the destination server subsequently removes the outer header (e.g., decapsulates the second VXLAN frame) to obtain the rewritten MAC frame within. In Step 646, the destination server vswitch processes the rewritten MAC frame and bridges (i.e., sends using the destination MAC address in the rewritten MAC frame) the rewritten MAC frame to the destination VM. The destination VM (i.e., VM A2) subsequently processes the rewritten MAC frame and extracts the payload FIG. 7A shows an exemplary north-south path of a payload transmitted using a ToR switch as an overlay routing intermediate point in accordance with one or more embodiments of the invention. More specifically, FIG. 7A shows an exemplary path the payload from Machine M may take to reach the VM A2. The exemplary path tracks the path described in FIGS. 6A-6C. The components shown in FIG. 7A correspond to like-named components in FIG. 3 and FIGS. 6A-6C. Turning to FIG. 7A, as described above, a first VXLAN frame encapsulating the inbound MAC frame is transmitted by the Edge Switch to ToR Switch 2 via the IP Fabric. Subsequently, a second VXLAN frame encapsulating the rewritten MAC frame is transmitted by ToR Switch 2 to Server S2.

FIGS. 7B-7E show exemplary MAC or VXLAN frames in accordance with one or more embodiments of the invention. Specifically, FIG. 7B shows the inbound MAC frame (700) as described above with respect to Step 600 of FIG. 6A. FIG. 7C shows the first VXLAN frame (702) encapsulating the inbound MAC frame (700) as described above with respect to Step 604 of FIG. 6A. FIG. 7D shows the rewritten MAC frame (706) as described above with respect to Step 626 of FIG. 6B. Lastly, FIG. 7E shows the second VXLAN frame (708) encapsulating the rewritten MAC frame (706) as described above with respect to Step 640 of FIG. 6C.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transmitting media access control (MAC) frames, comprising:
   receiving, by a destination network device, a first virtual extensible local area network (VXLAN) frame;
   decapsulating the first VXLAN frame to obtain a first MAC frame, wherein the first MAC frame originates from a source server, wherein the source server is not directly connected to the destination network device;
   rewriting, by the destination network device and using a VM-to-VTEP (VMS2V) table, the first MAC frame to obtain a second MAC frame;
   determining a destination server virtual tunnel end point (VTEP) Internet Protocol (IP) address using at least a portion of the second MAC frame;
   generating a second VXLAN frame comprising the destination server VTEP IP address and the second MAC frame; and
   transmitting the second VXLAN frame to a destination server, wherein the destination server comprises a VTEP associated with the destination server VTEP IP address.

2. The method of claim 1, wherein determining the destination server VTEP IP address comprises:

obtaining a destination virtual machine (VM) IP address from the second MAC frame;
identifying, using the destination VM IP address and the VM-to-VTEP (VMS2V) table, the destination server VTEP IP address.

3. The method of claim 1, wherein the first MAC frame comprises a destination virtual machine (VM) IP address associated with a destination VM, wherein the destination VM is executing on the destination server.

4. The method of claim 3, further comprising:
prior to receiving the first VXLAN frame:
transmitting, by the destination network device to a network controller, information relating the destination VM IP address to a destination network device IP address associated with the destination network device,
wherein the network controller, upon receipt of the information, generates a mapping using the information.

5. The method of claim 4, wherein the first VXLAN frame comprises a destination network device VTEP IP address, and wherein the destination network device VTEP IP address is derived using at least the mapping, wherein the mapping is shared by the network controller with a source network device directly connected to the source server.

6. The method of claim 3, further comprising:
prior to receiving the first VXLAN frame:
transmitting, by the destination network device to the destination server, a destination network device IP address associated with the destination network device using link layer discovery protocol (LLDP),
wherein the destination server transmits the destination network device IP address to a host orchestration system, and
wherein the host orchestration system generates a mapping relating the destination VM IP address to the destination network device IP address.

7. A network device, comprising:
a plurality of ports; and
a processor operatively connected to the plurality of ports and configured to:
receive, at a first port of the plurality of ports, a first virtual extensible local area network (VXLAN) frame;
decapsulate the first VXLAN frame to obtain a first media access control (MAC) frame, wherein the first MAC frame originates from a source server, wherein the source server is not directly connected to the network device;
rewrite, using a VM-to-VTEP (VMS2V) table, the first MAC frame to obtain a second MAC frame;
determine a destination server virtual tunnel end point (VTEP) Internet Protocol (IP) address using at least a portion of the second MAC frame;
generate a second VXLAN frame comprising the destination server VTEP IP address and the second MAC frame; and
transmit, at a second port of the plurality of ports, the second VXLAN frame to a destination server, wherein the destination server comprises a VTEP associated with the destination server VTEP IP address.

8. The network device of claim 7, wherein to determine the destination server VTEP IP address, the processor is further configured to:
obtain a destination virtual machine (VM) IP address from the second MAC frame; and identify, using the VM IP address and the VM-to-VTEP (VMS2V) table, the destination server VTEP IP address.

9. The network device of claim 7, wherein the first MAC frame comprises a destination virtual machine (VM) IP address associated with a destination VM, wherein the destination VM is executing on the destination server.

10. The network device of claim 9, further comprising:
prior to receiving the first VXLAN frame, the processor is further configured to:
transmit, to a network controller, information relating the destination VM IP address to a destination network device IP address associated with the network device,
wherein the network controller, upon receipt of the information, generates a mapping using the information.

11. The network device of claim 10, wherein the first VXLAN frame comprises a destination network device VTEP IP address, and wherein the destination network device VTEP IP address is derived using at least the mapping, wherein the mapping is shared by the network controller with another network device directly connected to the source server.

12. The network device of claim 9, further comprising:
prior to receiving the first VXLAN frame, the processor is further configured to:
transmit, to the destination server, a destination network device IP address associated with the network device using link layer discovery protocol (LLDP),
wherein the destination server transmits the destination network device IP address to a host orchestration system, and
wherein the host orchestration system generates a mapping relating the destination VM IP address to the destination network device IP address.

13. The network device of claim 7, wherein the network device is one selected from a group consisting of a switch, a router, and a multilayer switch.

14. A non-transitory computer readable medium (CRM) comprising computer readable program code, which when executed by a computer processor, enables the computer processor to:
receive a first virtual extensible local area network (VXLAN) frame;
decapsulate the first VXLAN frame to obtain a first media access control (MAC) frame, wherein the first MAC frame originates from a source server, wherein the source server is not directly connected to a destination network device on which the computer processor resides;
rewrite using a VM-to-VTEP (VMS2V) table the first MAC frame to obtain a second MAC frame;
determine a destination server virtual tunnel end point (VTEP) Internet Protocol (IP) address using at least a portion of the second MAC frame;
generate a second VXLAN frame comprising the destination server VTEP IP address and the second MAC frame; and
transmit the second VXLAN frame to a destination server, wherein the destination server comprises a VTEP associated with the destination server VTEP IP address.

15. The non-transitory CRM of claim 14, wherein to determine the destination server VTEP IP address, the non-transitory CRM further comprises additional computer readable program code, which when executed by the computer processor, enables the computer processor to:

obtain a destination virtual machine (VM) IP address from the second MAC frame; and identify, using the VM IP address and the VM-to-VTEP (VMS2V) table, the destination server VTEP IP address.

16. The non-transitory CRM of claim 14, wherein the first MAC frame comprises a destination virtual machine (VM) IP address associated with a destination VM, wherein the destination VM is executing on the destination server.

17. The non-transitory CRM of claim 16, further comprising additional computer readable program code, which when executed by the computer processor, enables the computer processor to:

prior to receiving the first VXLAN frame:

transmit, to a network controller, information relating the destination VM IP address to a destination network device IP address associated with the destination network device, wherein the network controller, upon receipt of the information, generates a mapping using the information.

18. The non-transitory CRM of claim 17, wherein the first VXLAN frame comprises a destination network device VTEP IP address, and wherein the destination network device VTEP IP address is derived using at least the mapping, wherein the mapping is shared by the network controller with a source network device directly connected to the source server.

19. The non-transitory CRM of claim 16, further comprising additional computer readable program code, which when executed by the computer processor, enables the computer processor to:

prior to receiving the first VXLAN frame:

transmit, to the destination server, a destination network device IP address associated with the destination network device using link layer discovery protocol (LLDP), wherein the destination server transmits the destination network device IP address to a host orchestration system, and wherein the host orchestration system generates a mapping relating the destination VM IP address to the destination network device IP address.

20. The non-transitory CRM of claim 14, wherein the destination network device is one selected from a group consisting of a switch, a router, and a multilayer switch.

* * * * *